United States Patent
Hornung et al.

(10) Patent No.: US 11,907,130 B1
(45) Date of Patent: Feb. 20, 2024

(54) DETERMINING WHETHER TO PERFORM AN ADDITIONAL LOOKUP OF TRACKING CIRCUITRY

(71) Applicant: Arm Limited, Cambridge (GB)

(72) Inventors: Alexander Alfred Hornung, Cambridge (GB); Kenny Ju Min Yeoh, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/101,602

(22) Filed: Jan. 26, 2023

(51) Int. Cl.
G06F 12/0877 (2016.01)
G06F 9/38 (2018.01)
G06F 12/0864 (2016.01)

(52) U.S. Cl.
CPC ........ G06F 12/0877 (2013.01); G06F 9/3834 (2013.01); G06F 12/0864 (2013.01); G06F 2212/603 (2013.01); G06F 2212/6022 (2013.01)

(58) Field of Classification Search
None
See application file for complete search history.

(56) References Cited

U.S. PATENT DOCUMENTS

| | | | | |
|---|---|---|---|---|
| 5,752,069 A * | 5/1998 | Roberts | ............. | G06F 9/3824 711/204 |
| 6,016,533 A * | 1/2000 | Tran | ............. | G06F 9/30152 711/128 |
| 2014/0304492 A1 * | 10/2014 | Abdallah | ............. | G06F 12/1054 712/217 |
| 2015/0067305 A1 * | 3/2015 | Olson | ............. | G06F 9/30043 712/225 |
| 2015/0309792 A1 * | 10/2015 | Meier | ............. | G06F 9/3826 712/225 |
| 2017/0123794 A1 * | 5/2017 | Chen | ............. | G06F 9/3857 |
| 2018/0081590 A1 * | 3/2018 | Farahani | ............. | G06F 13/1673 |
| 2018/0342096 A1 * | 11/2018 | Peterson | ............. | G06T 15/80 |
| 2022/0358037 A1 * | 11/2022 | Favor | ............. | G06F 9/3838 |

OTHER PUBLICATIONS

Akkary et al. "Checkpoint Processing and Recovery: An Efficient Scalable Alternative to Reorder Buffers." Nov.-Dec. 2003. IEEE. IEEE Micro. vol. 3. pp. 11-19.*

(Continued)

*Primary Examiner* — Nathan Sadler
(74) *Attorney, Agent, or Firm* — NIXON & VANDERHYE P.C.

(57) ABSTRACT

An apparatus comprising a cache comprising a plurality of cache entries, cache access circuitry responsive to a cache access request to perform, based on a target memory address associated with the cache access request, a cache lookup operation, tracking circuitry to track pending requests to modify cache entries of the cache, and prediction circuitry responsive to the cache access request to make a prediction of whether the pending requests tracked by the tracking circuitry include a pending request to modify a cache entry associated with the target memory address, wherein the cache access circuitry is responsive to the cache access request to determine, based on the prediction, whether to perform an additional lookup of the tracking circuitry. A method and a non-transitory computer-readable medium to store computer-readable code for fabrication of the apparatus are also provided.

11 Claims, 9 Drawing Sheets

(56) References Cited

OTHER PUBLICATIONS

Park et al. "Reducing Design Complexity of the Load/Store Queue." Dec. 2003. IEEE. MICRO-36.*

Amir Roth. "A High-Bandwidth Load-Store Unit for Single- and Multi-Threaded Processors." Jan. 2004. University of Pennsylvania Department of Computer and Information Science Technical Report No. MS-CIS-04-09.*

Tuck et al. "Scalable Cache Miss Handling for High Memory-Level Parallelism." Dec. 2006. IEEE. Micro '06.*

Mathew et al. "Low power L2 cache design using partially tagged bloom filter and hotline check." Jan. 2013. IEEE. ICCCI-2013.*

Lee et al. "Write Buffer-Oriented Energy Reduction in the L1 Data Cache for Embedded Systems." Feb. 2016. IEEE. IEEE Transactions on Very Large Scale Integration (VLSI) Systems. vol. 24. pp. 871-883.*

* cited by examiner

Additional lookup in
store buffer

|  | CACHE HIT | CACHE MISS |
|---|---|---|
| STORE BUFFER HIT – FULL OVERLAP | Access from store buffer / stall / fault | Access from store buffer / stall / fault |
| STORE BUFFER HIT – PARTIAL / NO OVERLAP | Access in cache | Refill then access in cache |
| STORE BUFFER MISS | Access in cache | Refill then access in cache |

FIG. 3

Additional lookup in refill logic

|  | CACHE HIT | CACHE MISS |
|---|---|---|
| PENDING EVICTION | Force miss / signal fault | |
| PENDING ALLOCATION | | Wait / signal fault |
| NOT PENDING EVICTION OR ALLOCATION | Access in cache | Refill then access in cache |

FIG. 4

DETERMINING WHETHER TO PERFORM AN ADDITIONAL LOOKUP OF TRACKING CIRCUITRY

BACKGROUND

The present technique relates to the field of data processing.

A data processing apparatus may comprise a cache to store copies of data in, for example, memory, allowing one of more processors to access the data with reduced latency.

SUMMARY

Viewed from one example, the present technique provides an apparatus comprising:
 a cache comprising a plurality of cache entries;
 cache access circuitry responsive to a cache access request to perform, based on a target memory address associated with the cache access request, a cache lookup operation;
 tracking circuitry to track pending requests to modify cache entries of the cache; and
 prediction circuitry responsive to the cache access request to make a prediction of whether the pending requests tracked by the tracking circuitry include a pending request to modify a cache entry associated with the target memory address,
 wherein the cache access circuitry is responsive to the cache access request to determine, based on the prediction, whether to perform an additional lookup of the tracking circuitry.

Viewed from another example, the present technique provides a method comprising:
 tracking, using tracking circuitry, pending requests to modify cache entries of a cache, the cache comprising a plurality of cache entries; and
 in response to a cache access request:
 performing, based on a target memory address associated with the cache access request, a cache lookup operation;
 making a prediction of whether the pending requests tracked by the tracking circuitry include a pending request to modify a cache entry associated with the target memory address; and
 determining, based on the prediction, whether to perform an additional lookup of the tracking circuitry.

Viewed from another example, the present technique provides a computer program comprising instructions which, when executed on a computer, cause the computer to fabricate an apparatus comprising:
 a cache comprising a plurality of cache entries;
 cache access circuitry responsive to a cache access request to perform, based on a target memory address associated with the cache access request, a cache lookup operation;
 tracking circuitry to track pending requests to modify cache entries of the cache; and
 prediction circuitry responsive to the cache access request to make a prediction of whether the pending requests tracked by the tracking circuitry include a pending request to modify a cache entry associated with the target memory address,
 wherein the cache access circuitry is responsive to the cache access request to determine, based on the prediction, whether to perform an additional lookup of the tracking circuitry.

Viewed from another example, the present technique provides a computer-readable medium to store the computer program described above. The computer-readable medium can be transitory or non-transitory.

Further aspects, features and advantages of the present technique will be apparent from the following description of examples, which is to be read in conjunction with the accompanying drawings.

BRIEF DESCRIPTION OF THE DRAWINGS

FIG. 3 illustrates an example of how cache access circuitry may operate depending on whether a hit or a miss is detected in each of the cache and the store buffer;
FIG. 4 illustrates an example of how cache access circuitry may operate depending on whether a hit or a miss is detected in each of the cache and the cache refill logic.

DESCRIPTION OF EXAMPLES

Figure 1:
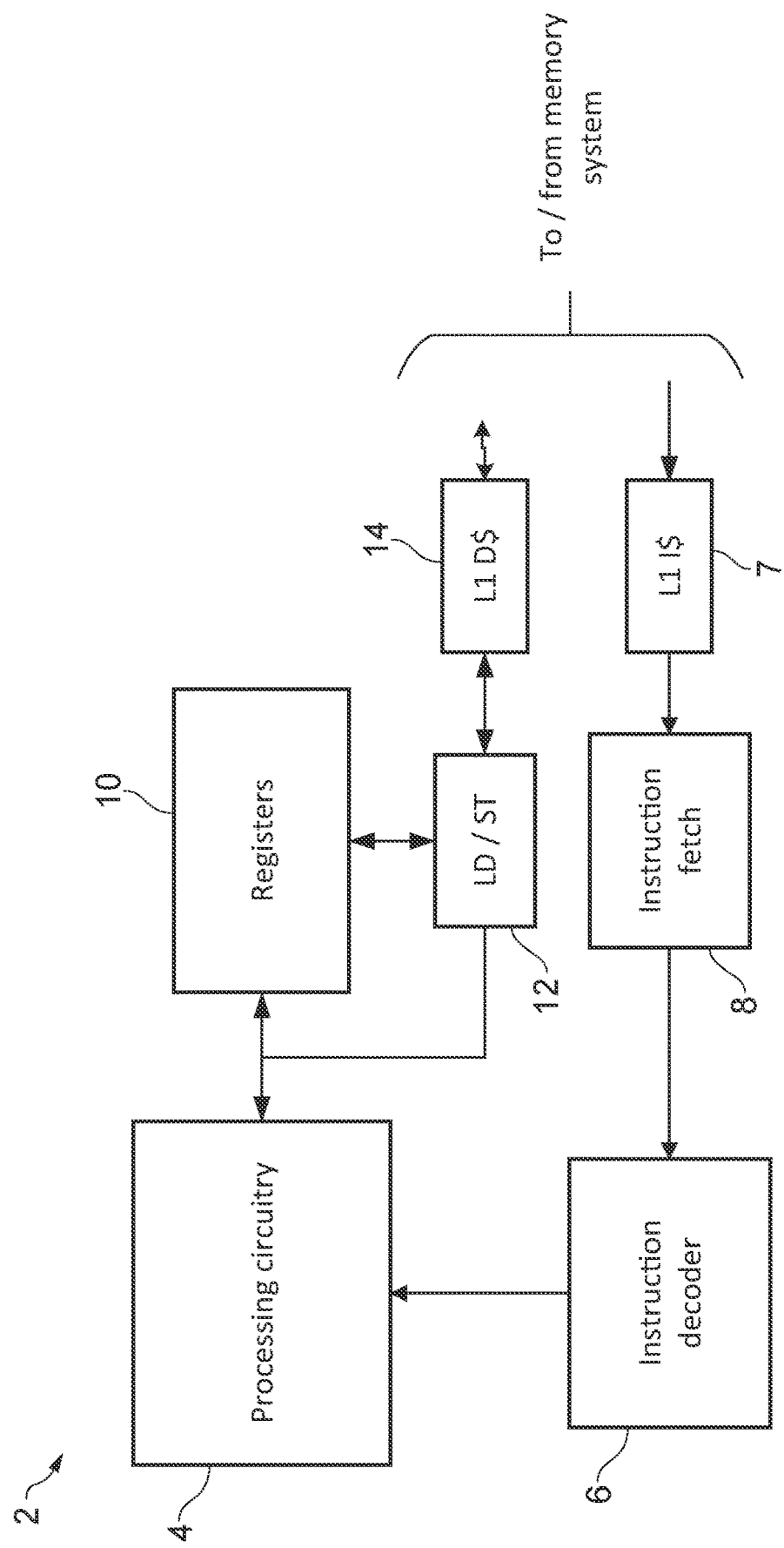
FIG. 1 illustrates a data processing apparatus.

Before discussing example implementations with reference to the accompanying figures, the following description of example implementations and associated advantages is provided.

In accordance with one example configuration there is provided an apparatus comprising a cache comprising a plurality of cache entries. A cache is a storage structure (also referred to herein as storage circuitry) configured to store data—for example, a cache may store copies of data that are also stored in a memory, such that one or more processors can access the copies of the data with a lower latency than would be associated with accessing the data in memory. Thus, each cache entry of the cache may be capable of storing data, and may be associated with a memory address (e.g. this could be a virtual address, a physical address or an intermediate physical address).

The apparatus also comprises cache access circuitry responsive to a cache access request to perform, based on a target memory address associated with the cache access request, a cache lookup operation. For example, the cache access request may be a request to access (e.g. load or store) data in the cache, and the target memory address may identify which data is to be accessed in response to the request.

The apparatus of the present technique also comprises tracking circuitry to track pending requests to modify cache entries of the cache.

When the cache access circuitry performs the cache lookup operation, it may detect a "hit" condition if an entry associated with the target memory address is determined to be present in the cache. On the other hand, the cache access circuitry may detect a "miss" condition if it is determined that there is no entry in the cache that is associated with the target memory address. Typically, if a hit is detected, the requested data is accessed in the cache (e.g. if the cache access request is a load request, the requested data may be read from the identified cache entry, whereas if the cache access request is a store request, data associated with the cache access request may be stored in the identified cache entry). If a miss is detected, a cache refill operation may be performed, to bring the requested data into the cache (for example).

An additional lookup (e.g. one or more lookup operations performed in addition to the cache lookup) of the tracking circuitry can also be performed, e.g. in order to determine whether any of the pending requests tracked by the tracking circuitry are to modify cache entries associated with the target memory address. However, such an additional lookup can be fairly power consuming, for example due to the need to toggle relatively expensive comparison logic associated with the tracking circuitry. Hence, it would be advantageous to be able to reduce the power consumption and latency associated with performing cache lookup operations.

To address this, the apparatus of the present technique comprises prediction circuitry, which is responsive to the cache access request to make a prediction of whether the pending requests tracked by the tracking circuitry include a pending request to modify a cache entry associated with the target memory address. The cache access circuitry is responsive to the cache access request to determine, based on the prediction, whether to perform an additional lookup of the tracking circuitry.

Determining whether to perform the additional lookup in dependence on the prediction made by the prediction circuitry reduces the power consumption of the system, by making it possible to avoid the additional lookup in at least some of the situations in which the lookup is not needed. Moreover, the performance of the apparatus can also be improved, by avoiding the additional latency associated with performing the additional lookup in such situations.

In some examples, the tracking circuitry comprises at least one of:
  a store buffer to track pending store operations to store data in the cache; and
  cache refill control circuitry, the cache refill control circuitry being responsive to detecting a cache miss to copy requested data from memory into the cache, wherein the cache refill control circuitry is configured to track pending evictions of data from the cache and pending allocations of data to the cache.

In this example, one or both of the store buffer and the cache refill control circuitry (also referred to herein as cache refill logic) may be provided (e.g. the tracking circuitry could include one or both of these structures). The store buffer tracks store operations (e.g. which may have been issued by processing circuitry executing store instructions), where store operations are requests to store data to one or more entries in the cache. The cache refill logic may control the allocation of data to the cache—for example, when a cache access misses (e.g. the requested data is not present in the cache), the cache refill logic may be responsible for selecting a victim entry in the cache to invalidate (evict), and bringing a copy of the requested data from memory into the cache.

In some examples, the tracking circuitry comprises the store buffer, the prediction circuitry comprises prediction data storage circuitry to store prediction data for use in making the prediction, and the prediction circuitry is responsive to a store request being issued to the store buffer, the store request being associated with a given memory address, to update the prediction data to indicate that a store buffer lookup should be performed, as the additional lookup, in response to a subsequent cache access request associated with the given memory address.

There are many ways in which the prediction circuitry could predict whether the store buffer tracks a store operation to store data to a cache entry associated with a given memory address, but in this example the prediction circuitry tracks store requests issued to the store buffer, and maintains prediction data that is updated each time a store request is issued.

In some examples, the tracking circuitry comprises the store buffer, the prediction circuitry comprises prediction data storage circuitry to store prediction data for use in making the prediction, and the prediction circuitry is responsive to misses being detected following lookups, based on a given memory address, in both the cache and the store buffer to update the prediction data to indicate that a store buffer lookup need not be performed, as the additional lookup, in response to a subsequent access request associated with the given memory address.

This update to the prediction data helps to maintain accurate prediction data, thus improving the accuracy of the predictions made by the prediction circuitry and reducing the number of additional lookups of the store buffer that are performed.

In some examples, each cache entry is configured to store a block of data, and the cache access request specifies a subset of the block of data stored in the cache entry associated with the target address. In these examples, the tracking circuitry comprises the store buffer, and the prediction circuitry is configured to make a further prediction, in response to predicting that the pending store operations tracked by the store buffer include a pending request to store the target data to the cache entry associated with the target memory address, of whether the target data encompasses the subset specified by the cache access request. In these examples, the cache access circuitry is configured to determine, based on the prediction and the further prediction, whether to perform an additional lookup of the tracking circuitry.

In this example, each cache entry stores a block of data of a predetermined size (e.g. the amount of data stored in a single cache entry is sometimes referred to as a cache line). Cache access requests—including the store operations tracked by the store buffer—can request the entire block of data stored in a cache entry—for example, the subset could be the entire block of data. However, in this example cache access requests may also be permitted to request access to a portion (some but not all, a proper subset) of the block of data—for example, a portion of the target memory address may identify the portion of the block of data to be accessed. When it is determined that the store buffer contains a store operation associated with the target memory address, it can be useful to make a further prediction of whether the subset of the block of data identified by the store operation encompasses the subset specified by the cache access request. This further prediction (in addition to the original prediction) can then be used to determine whether to perform the additional lookup.

In some examples, the tracking circuitry comprises the cache refill control circuitry the additional lookup, the prediction circuitry comprises prediction data storage circuitry to store prediction data for use in making the prediction, and the prediction circuitry is responsive to a cache miss being detected following a lookup, based on a given memory address, in the cache to update the prediction data to indicate that a cache refill control circuitry lookup should be performed, as the additional lookup, in response to a subsequent cache access request associated with the given memory address as the target memory address.

A cache refill operation may be triggered when a cache miss is detected following a cache lookup operation; hence, in this example, the prediction data is updated when a cache miss is detected, such that the prediction data can track cache refill operations which have been triggered.

In some examples, the tracking circuitry comprises the cache refill control circuitry, the prediction circuitry comprises prediction data storage circuitry to store prediction data for use in making the prediction, and the prediction circuitry is responsive to a cache hit being detected following the lookup, based on a given memory address, in the cache to update the prediction data to indicate that a cache refill control circuitry lookup need not be performed, as the additional lookup, in response to a subsequent cache access request associated with the given memory address as the target memory address.

If a cache refill operation is triggered by a cache miss associated with a particular memory address, a subsequent hit associated with the same memory address may indicate that the cache refill operation has completed. Hence, it can be helpful—as in this example—to update the prediction data in response to detecting a cache hit.

In some examples, the cache comprises a set-associative cache, and the apparatus comprises cache way prediction circuitry responsive to the cache access request to predict which of a plurality of ways stores data associated with the target memory address, the cache way prediction circuitry comprising the prediction circuitry.

A cache way tracker may be a structure looked up by memory address (or by a portion of the memory address) that provides information on cache hits (e.g. whether a given block of data is present in the cache and, if so, in which way). In this example of the present technique, the functionality of the cache way tracker is extended to additionally provide information as to whether the additional lookup needs to be performed in response to the cache access request. This is a particularly advantageous implementation of the present technique, because it makes use of a structure (the cache way tracker) which may already be provided, hence reducing the circuit area (and, hence, power consumption) required to implement the present technique.

In some examples, the cache way prediction circuitry comprises prediction data storage circuitry to store, for corresponding address information, prediction data indicative of:
  a predicted one of the plurality of ways that is predicted to store data associated with the corresponding address information; and
  whether the pending requests tracked by the tracking circuitry are predicted to include a pending request to modify a cache entry associated with the corresponding address information.

In this way, the prediction data can be used both to predict which way of the cache stores data associated with a given memory address, and to predict whether the additional lookup should be performed.

In some examples, the pending requests to modify cache entries to the cache comprise at least one of:
  pending store operations to store data in the cache;
  pending invalidation operations to invalidate data in the cache;
  pending linefill operations to copy data from memory into the cache; and
  pending eviction operation to evict data from the cache.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 schematically illustrates an example of a data processing apparatus 2 (for example a CPU or GPU) which comprises processing circuitry 4 for performing data processing operations in response to instructions decoded by an instruction decoder 6. The instructions decoded by the instruction decoder 6 are fetched from a level 1 (1_1)

instruction cache by instruction fetch circuitry 8. The instruction cache stores copies of instructions in memory.

Based on the decoded instructions, the instruction decoder generates control signals to control the processing circuitry 4 to perform data processing operations represented by the instructions. Operands for the data processing operations are obtained from registers (selected as source registers), in a register file 10 comprising a certain number of registers. Results of the operations are written back to registers 10 (selected as destination registers) by the processing circuitry 4. For load/store instructions requesting that data from a cache or memory is loaded to the registers 10 or that data in the registers 10 is stored to a cache or memory, a load/store unit 12 may be instructed to carry out the load/store operation.

In addition to the instruction cache 7, a level 1 data cache 14 is provided to store copies of a subset of the data in memory. When performing an access (e.g. a read or write access), the load/store unit 12 may access the data in the cache instead of (or as well as) accessing it in the memory. Further levels of cache may be provided in addition to the level 1 caches (e.g. the memory system may have a hierarchical arrangement). Moreover, it is not essential for the instruction cache and the data cache to be separate—a shared cache storing both data and instructions can be provided.

It will be appreciated that FIG. 1 is a simplified example of a CPU or GPU 2 and that the CPU or GPU may include many other elements not shown in FIG. 1 for conciseness.

Figure 2:
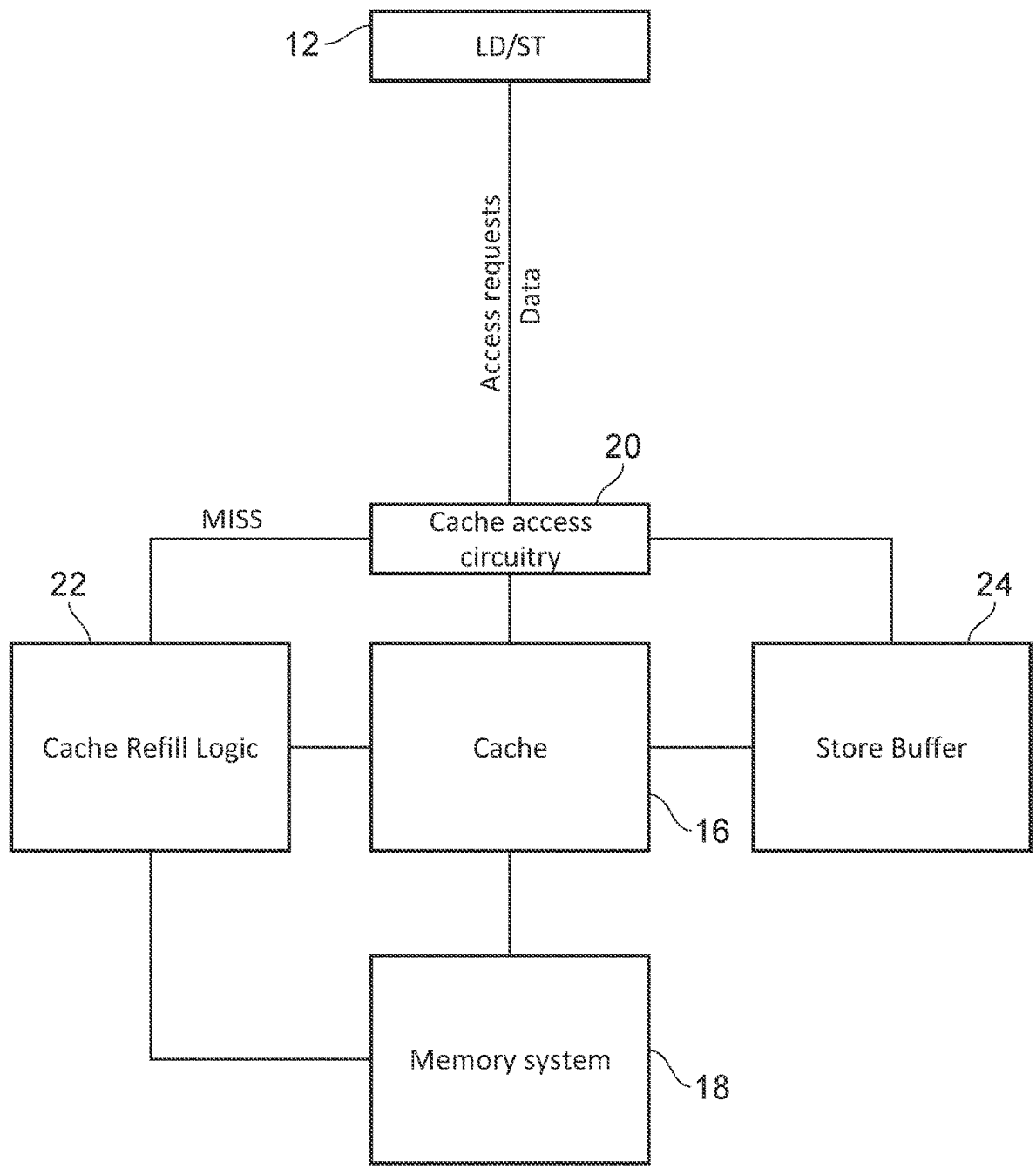
FIG. 2 illustrates circuitry associated with a cache.

FIG. 2 shows an example of some circuitry which may be provided in association with a cache 16. The cache 16 shown in FIG. 2 may be one of the caches 7, 14 shown in FIG. 1, for example, and is an example of a cache comprising a plurality of cache entries. The cache comprises storage circuitry configured to store data (which may include instructions). For example, the data stored in the cache may represent (e.g. it could be a copy of) data stored elsewhere in the memory system 18 (e.g. in memory), allowing the data to be accessed in the cache 16 with reduced latency compared with accessing the data in memory. Note that in some situations it may be possible for data to be updated in the cache 16 without updating the corresponding data in memory—in this case, the data in the cache may not be an exact copy of data in memory.

Accesses (e.g. loads and stores) to the cache are controlled by cache access circuitry 20. In particular, the cache access circuitry is responsive to access requests (e.g. read requests and/or write requests) issued by the load/store unit 12 to perform a cache lookup operation—hence, the cache access circuitry 20 is an example of cache access circuitry responsive to a cache access request to perform, based on a target memory address associated with the cache access request, a cache lookup operation. Each access request specifies a target memory address identifying a location in memory (e.g. the target memory address thus identifies the data to be accessed), and the target memory address could be a physical address (PA), a virtual address (VA) or an intermediate physical address (IPA), for example. The cache lookup operation performed by the cache access circuitry is to determine whether there is an entry in the cache which corresponds to the target memory address. If it is determined that a valid entry corresponding to the target memory address is present in the cache, this is considered to be a "hit". On the other hand, if it is determined that there is no valid entry in the cache corresponding to the target memory address, this is considered to be a "miss".

When a hit is detected following the cache lookup operation, the access can be performed in the cache (e.g. data can be read from or written to the identified cache entry). When a miss is detected, the data needs to be brought into the cache before this access can be performed—cache refill logic 22 is provided for the purpose. The cache refill logic is circuitry which is responsible for, in response to a cache miss being detected, performing a cache linefill operation to bring the requested data from the memory into the cache. In particular, the linefill operation involves:

- selecting a "victim entry" of the cache to be evicted (invalidated)—this selection may be made on the basis of a cache eviction policy, such as a least-recently-used (LRU) policy, a least-frequently-used (LFU) policy, a first-in-first-out (FIFO) policy, or any other applicable eviction policy;
- bringing the requested data from a memory location corresponding to the target memory address into the cache (in particular, into the cache entry that was freed up by the eviction).

While the linefill operation is in progress, the cache refill logic tracks pending evictions of data from the cache and pending allocations of data to the cache; hence, the cache refill logic is an example of tracking circuitry to track pending requests to modify cache entries of the cache.

A store buffer 24 is also provided. The store buffer comprises circuitry which tracks pending store operations (also referred to herein as store requests or write requests) to store data in the cache. Accordingly, the store buffer is another example of tracking circuitry to track pending requests to modify cache entries of the cache.

Since the tracking circuitry (e.g. the cache refill logic 22 and the store buffer 24) tracks pending requests to modify entries in the cache 16, additional lookups of these structures may also be performed in response to a cache access request. FIGS. 3 and 4 illustrate why this might be useful.

FIG. 3 illustrates actions which could be taken by the cache access circuitry in response to hit/miss detections following the cache lookup and an additional lookup of the store buffer. A hit in the store buffer means that at least one of the pending store requests tracked by the store buffer is associated with the same target memory address as is specified by the cache access request. This may mean that, if the cache access request is a read request, the data being read from or written to the cache will be modified/overwritten by the pending store request. However, it should be noted that a store request or cache access request may specify a particular subset (e.g. some but not necessarily all—for example, this could be one or more data words) of the block of data stored in a particular cache entry—this means that a pending store request and a cache access request associated with the same target memory address may not necessarily be targeting the exact same data.

Because of the possibility of a pending store request overwriting or updating the data being accessed in response to the cache access request, it can be helpful to identify such a pending store request with an additional lookup in the store buffer. If this additional lookup misses (e.g. it is determined that none of the pending store requests tracked by the store buffer is associated with the target memory address), the cache access circuitry may act in the same way as if the additional lookup had not been performed. For example, as shown in the bottom row of the figure, the cache access circuitry may respond to a cache hit by accessing the data in the cache, and may respond to a cache miss by initiating a cache linefill operation, before accessing the data in the cache.

The cache access circuitry may act in the same way if the additional lookup hits (e.g. it is determined that at least one of the pending store requests tracked by the store buffer is associated with the target memory address), but it is determined that the data associated with the identified pending store request(s) does not fully encompass the data to be accessed in response to the cache access request. This is shown by the middle row in the figure.

However, if the additional lookup of the store buffer hits, and it is determined that the data associated with a pending store request fully encompasses the data subject to the cache access request, the cache access circuitry may act differently. For example, if the cache lookup also hits, the data may be accessed in the store buffer instead of in the cache. Alternatively, the access request may stall (e.g. to wait until the store request has been completed) or may trigger a fault. Similarly, if the cache lookup misses, the data may be accessed in the store buffer instead of performing a cache linefill operation, or the access request may stall or trigger a fault.

FIG. 4 illustrates actions which could be taken by the cache access circuitry in response to hit/miss detections following the cache lookup and an additional lookup of the cache refill logic. A hit in the cache refill logic means that a pending cache eviction or a pending cache allocation has been identified which is associated with the target memory address.

If it is determined, following the additional lookup of the cache refill logic, that there is no pending eviction or allocation associated with the target memory address, the cache access circuitry acts in the same ways as if the additional lookup in the cache refill logic had not been performed (possibly in dependence on another additional lookup in the store buffer, as discussed above). This is shown in the bottom row of the figure.

If it is determined, following the additional lookup of the cache refill logic, that there is a pending allocation associated with the target memory address (in which case, the cache lookup will have resulted in a miss, since the cache refill logic allocates data to the cache in response to a miss), the cache access circuitry may either wait/stall until the allocation has completed (following which the access can be performed in the cache), or it may signal a fault (e.g. rather than initiating another cache linefill operation).

If, on the other hand, it is determined that there is a pending eviction associated with the target memory address (in which case, the cache lookup will have resulted in a hit, since an entry cannot be evicted from the cache if it is not present in the cache), the cache access circuitry may either force a miss (e.g. trigger a linefill operation) or signal a fault.

Accordingly, as demonstrated by FIGS. 3 and 4, it can be beneficial to perform an additional lookup in at least one of the store buffer and the cache refill logic (and/or any other tracking circuitry which may be provided). However, the additional lookup in either of these structures can be fairly expensive, in terms of the power consumed by the apparatus, due to the expensive comparison logic associated with each of these structures, and also in terms of the additional latency associated with performing the additional lookup(s). Hence, it would be advantageous to be able to reduce the cost (in terms of power consumption and latency) associated with accessing data in a cache.

Figure 5:
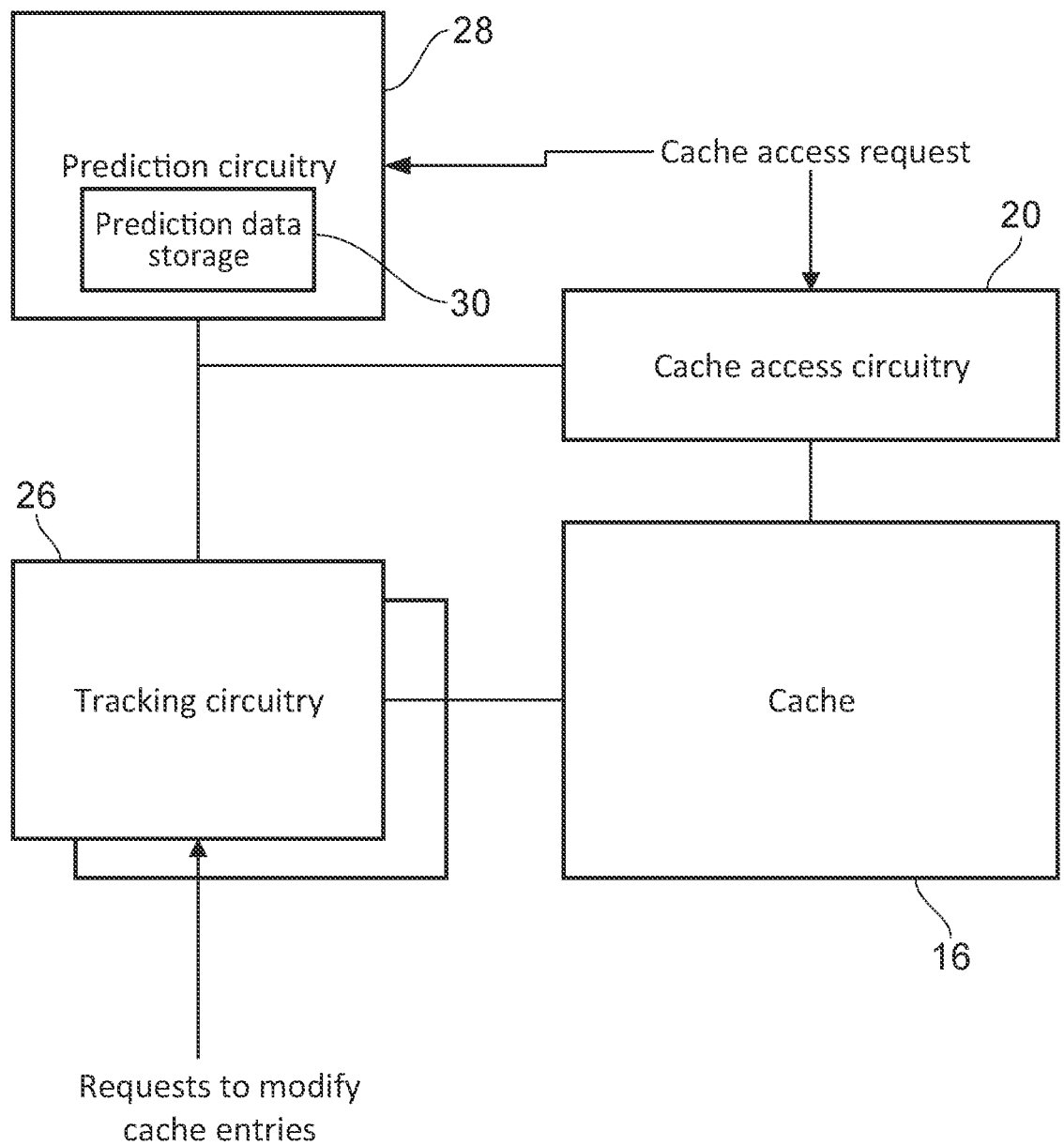
FIG. 5 illustrates another example of a data processing apparatus.

FIG. 5 illustrates an example of an apparatus which can address this problem. The apparatus shown in FIG. 5 may be provided within a data processing apparatus such as the data processing apparatus 100 shown in FIG. 1. The apparatus comprises a cache 16 and cache access circuitry 20, as described above. The apparatus also comprises tracking circuitry 26 to track pending requests to modify cache entries of the cache 16—for example, the tracking circuitry 26 could include one or both of the cache refill logic 22 and the store buffer 24 described above. Prediction circuitry 28 is also provided, and is responsive to a cache access request to predict whether the tracking circuitry 26 is tracking a request associated with the same target memory address as the cache access request. In this particular example, the prediction circuitry 28 also includes prediction data storage circuitry to store prediction data which is used to make the prediction. Hence, the prediction circuitry 28 shown in FIG. 5 is an example of prediction circuitry responsive to the cache access request to make a prediction of whether the pending requests tracked by the tracking circuitry include a pending request to modify a cache entry associated with the target memory address.

The cache access circuitry 20 can then use the prediction made by the prediction circuitry to determine whether or not to perform one or more additional lookups of the tracking circuitry. For example, the cache access circuitry 20 could determine that an additional lookup should be performed unless the prediction circuitry 28 predicts that there are no pending requests to modify one or more cache lines associated with the target memory address of the cache access request. However, it will be appreciated that the way in which the prediction is used to determine whether to perform the additional lookup is not limited to this example. Note that, if the tracking circuitry 26 includes more than one tracking structure (e.g. the cache refill logic and the store buffer could both be provided), it is possible for the cache access circuitry 20 to determine that one structure should be looked up while the other should not.

Providing the prediction circuitry 28, and determining whether to perform the additional lookup based on the prediction, makes it possible to avoid performing the additional lookup in some of the situations where the result of the additional lookup is unlikely to change the way in which the requested data is accessed in the cache. This helps to reduce the number of times an additional lookup is performed, hence reducing the power consumption of the system as a whole.

Figure 6:
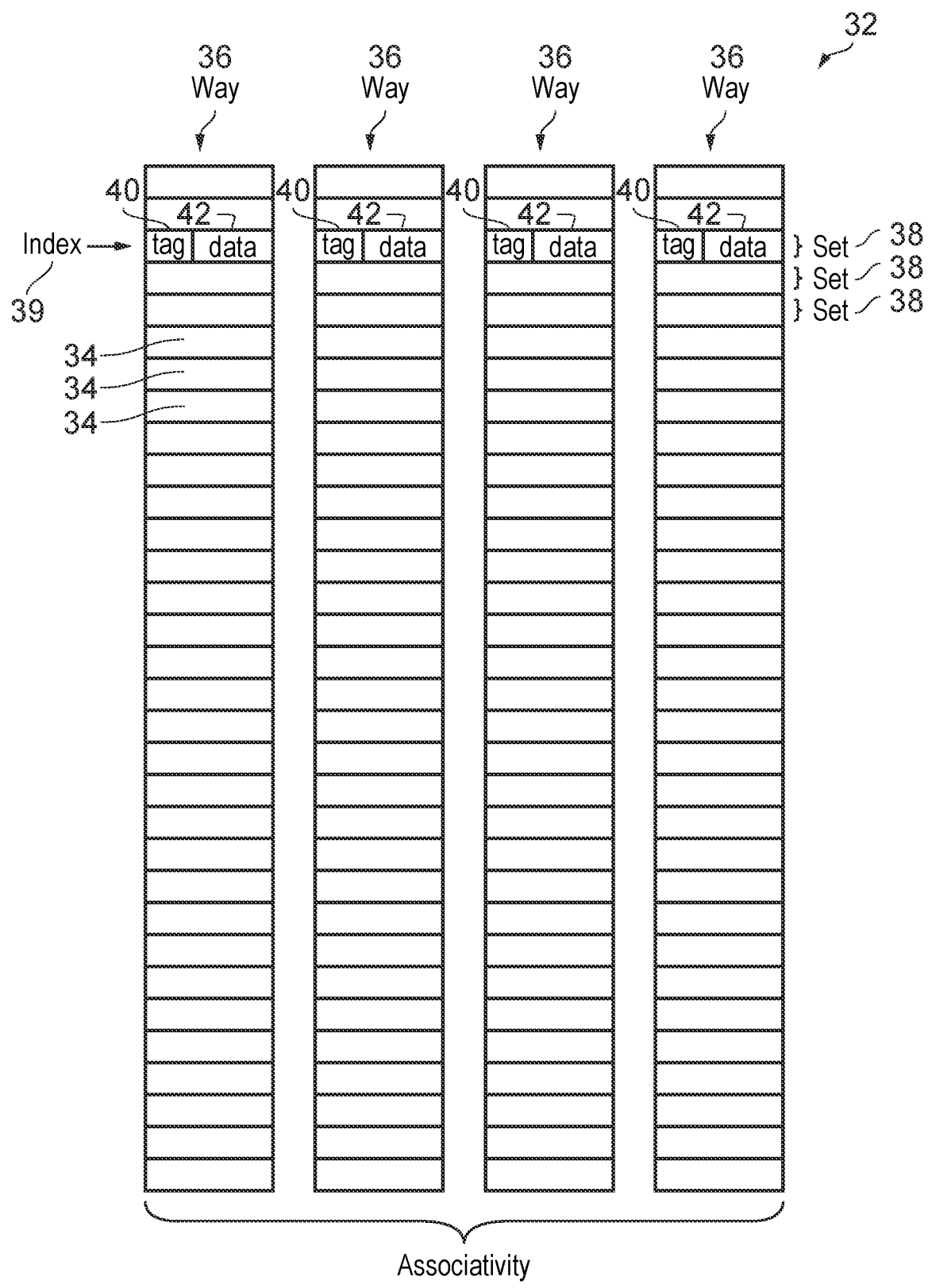
FIG. 6 illustrates a set-associative cache.

The cache 16 of the present technique can be any type of cache, and can have any placement policy. However, in a particular example, the cache 16 is a set-associative cache 32. As shown in FIG. 6, a set-associative cache 32 comprises a number of sets 38 of cache entries 34, each set 38 having two or more entries 34. For a cache having associativity A, this means that the number of entries in one set 38 is A. Such a cache can be described as an "A-way" set-associative cache and the entries can also be considered to be logically grouped into "ways" 36, where each set 38 comprises one entry 34 from each way 36. For example, a cache with 4 entries per set is 4-way set-associative. It will be appreciated that FIG. 6 merely shows the logical arrangement of the entries 34, and the physical arrangement of the entries 34 may be different. For example, "neighbouring" entries of the same set 38 or the same way 34 may in practice be arranged at separate physical locations in a memory device.

The set-associative placement policy used for such a cache means that when data having a given address needs to be allocated into the cache, it is placed in one of the entries 34 within a particular set 38 that is selected based on an index value 39 computed based on the given address. In some cases the index value 39 may simply be a portion of bits extracted from the given address, while in other examples the index 39 could be based on a more complicated function of the given address (e.g. applying a hash function to the given address to obtain the index value 39). Hence, data associated with a given address cannot be stored in entries 34 of sets 38 other than the set corresponding to the index 39 selected based on the given address. This is useful because it reduces the number of entries of the cache which have to be checked to determine whether the cache stores data associated with a specified target address, but in comparison to a direct-mapped cache (where data for a given address can only be allocated to a single entry 34 selected based on the address), the set-associative placement scheme improves performance as there is flexibility to allocate data for a given address to two or more locations, which reduces the likelihood of thrashing as it means two or more different addresses mapping to the same set can each be cached simultaneously. This contrasts with a fully-associated placement policy, where data can be allocated to any entry in the cache, and with a direct-mapped cache, where data can only be allocated to a particular entry of the cache (e.g. a direct-mapped cache can also be considered to be a 1-way set-associative cache).

Each entry 34 may specify a cache tag value 40 and a data value 42. The data value 42 is the information of interest which is stored in the corresponding cache entry 34. The data value 42 could be data or instructions, or could be address mapping information cached in a translation lookaside buffer, for example. The tag 40 corresponds to a portion of the target address which is not used to generate the index, and is stored alongside the cached data 42 to allow the different addresses which map to the same index to be distinguished from each other when looking up in the cache. Each entry 34 may also store state information associated with the corresponding address, such as a valid indicator indicating whether the data in the corresponding entry 34 is valid, coherency state information (e.g. a dirty bit indicating whether the data value 42 has been modified compared to the corresponding data value in a higher level cache (e.g. L2 or L3 cache) or memory), or replacement policy information for selecting a victim cache entry when an entry needs to be evicted from the cache.

Hence, on a cache access to check whether data associated with a target address is stored in the cache, the index value 39 derived from the target address is used to select a set 38 and each of the tag values 40 in the entries 34 within the selected set 38 are compared with the tag portion of the target address. If any of the read tag values 40 match the tag portion of the target address then the corresponding cache entry 34 having the matching tag 40 stores the data for the requested target address, and that entry can be read or written depending on the type of access being performed. In some examples, an additional portion of the target address (an offset portion) may be used to identify a particular data word within the entry to be accessed. The scenario when one of the tags 40 in the indexed set 38 matches the tag of the target address is called a cache hit.

On the other hand, if none of the tags 40 in the indexed set 38 match the tag of the target address, then this is known as a cache miss, and in this case the information associated with the target address may need to be fetched from a further data store, such as a further level of cache or main memory. If one of the indexed set of caches is invalid, then the invalid entry can be selected for allocating the new data associated with a target address. However, if all of the indexed set of entries are already filled with valid data then one entry 34 of the indexed set 38 can be selected as a victim entry for which the data 42 is to be evicted from the cache to make way for the new information associated with the target address.

Figure 7:
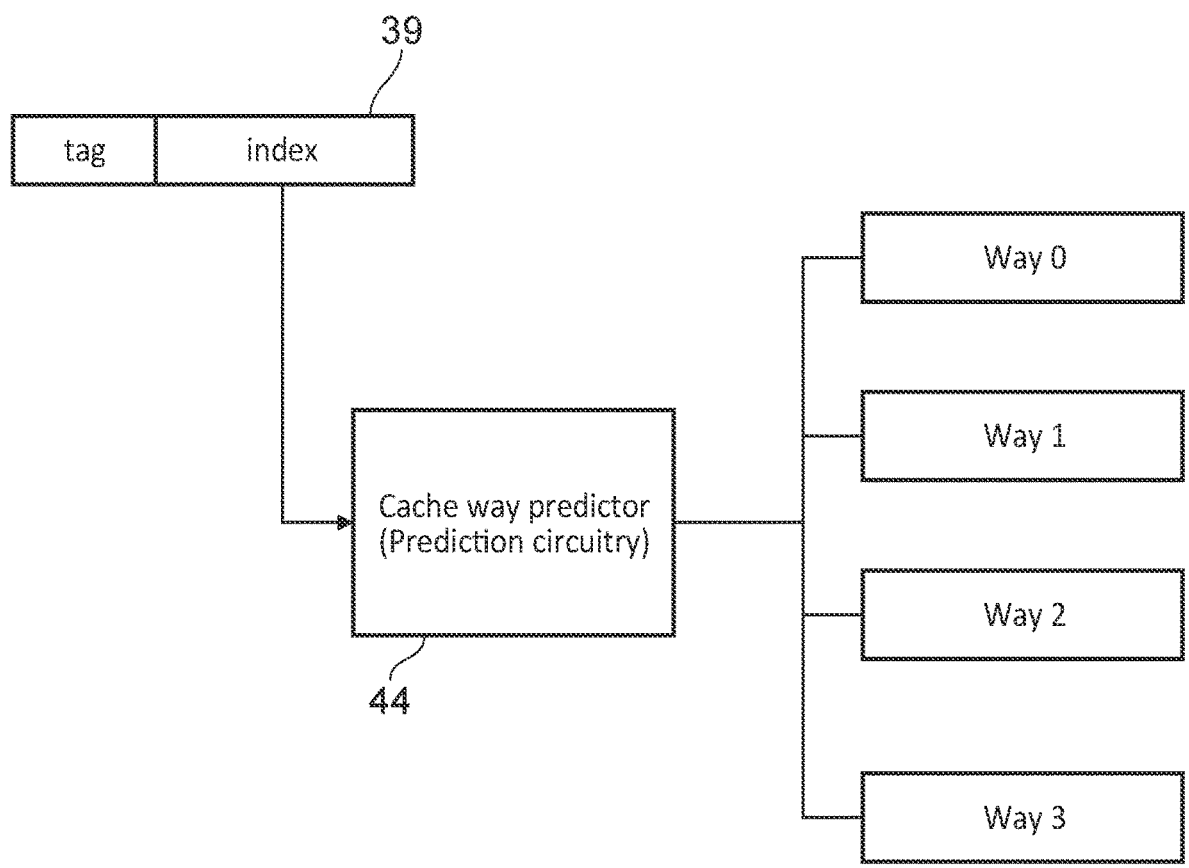
FIG. 7 illustrates a cache way tracker.

FIG. 7 shows a cache way predictor 44. In an apparatus comprising a set-associative cache, a cache way predictor 44 may be provided. A cache way predictor 44 is configured to predict, based on the target address (typically based on the index value 39), whether a given block of data (i.e. the block of data identified by the target memory address associated with the cache access request) is present in the cache, and which way that data is in. A cache way predictor 44 such as this can be useful, because it can avoid the need to power up the tag ram to compare the tag portion of the address with the tags 40 specified by each of the cache ways in a particular set.

In the present technique, the functionality of the cache way predictor 44 can be extended to also provide the functionality of the prediction circuitry 28 described above. This is a particularly advantageous implementation of the present technique, because it makes use of the comparison logic that provided in the cache way predictor to also predict the contents of the tracking circuitry—hence, this approach reduces the circuit area required to provide the functionality of both the prediction circuitry 28 and the cache way predictor (and hence also reduces the cost in terms of the power consumption of the circuitry).

However, it will be appreciated that the prediction circuitry 28 could be a separate structure from the cache way tracker 44, and indeed the cache way tracker 44 need not be provided at all.

Note that whether or not a cache way tracker 44 and/or prediction circuitry 28 are provided does not affect the functional correctness of data processing performed by the apparatus. For example, the result of a cache access will be the same regardless of whether the prediction circuitry and/or the cache way predictor 44 are provided (e.g. the same data will be read from/written to the cache). However, each of these structures can improve the performance and reduce the power consumption of the apparatus as a whole.

Figure 8:
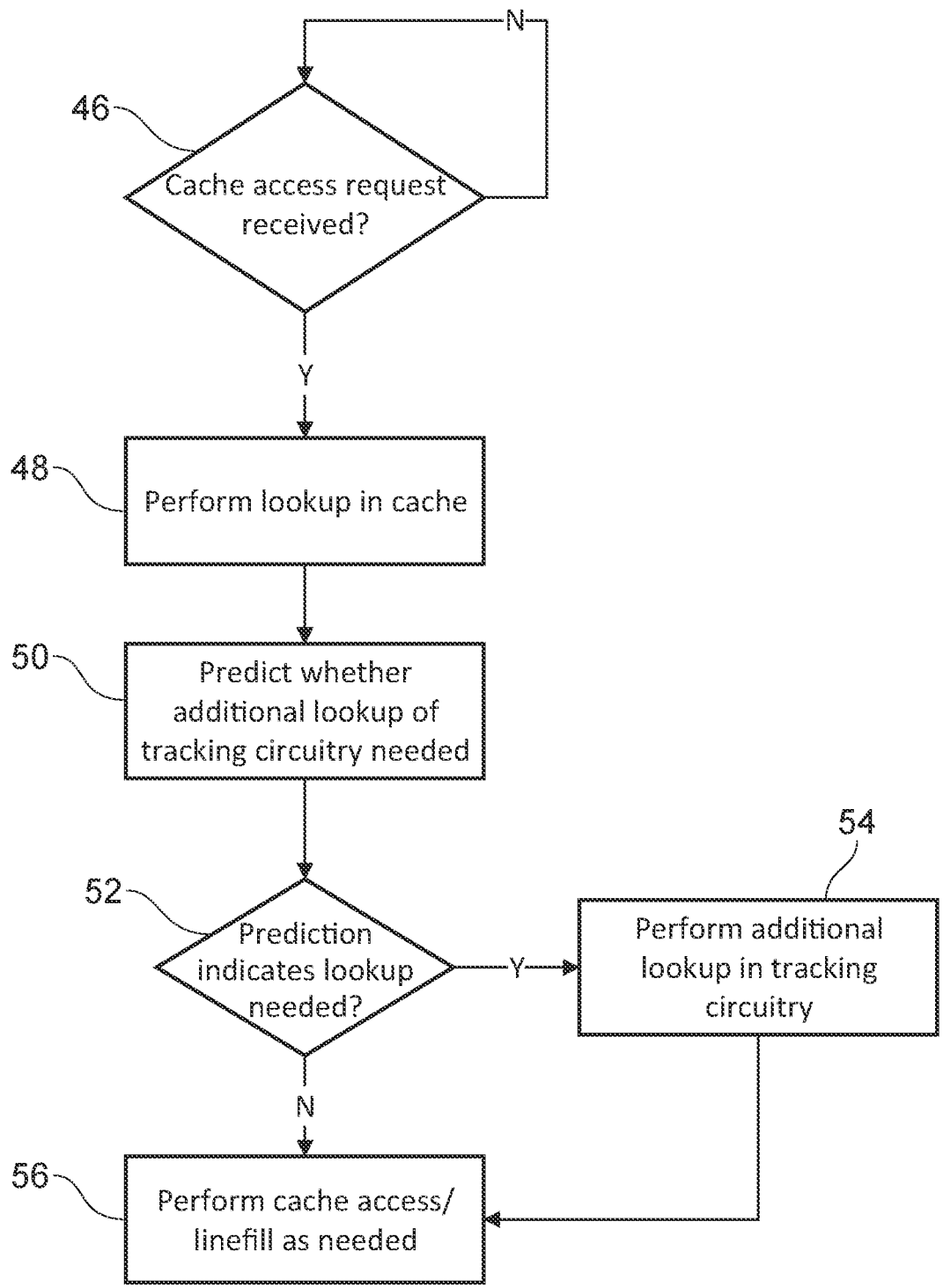
FIG. 8 is a flow diagram illustrating an example method performed in response to a cache access request.

FIG. 8 is a flow diagram illustrating an example of a method according to the present technique. The method includes a step 46 of determining whether a cache access request has been received. Once it is determined that a cache access request has been received ("Y"), the method includes a step 48 of performing a lookup (also referred to herein as a cache lookup or a cache lookup operation) to determine whether there is a valid entry in the cache which holds data corresponding to the target memory address specified by the cache access request. The method also includes a step 50 of predicting whether an additional lookup of the tracking circuitry should be performed. In step 52, it is determined, based on the prediction, whether the additional lookup is needed. If the additional lookup is predicted to be needed ("Y"), the method includes a step 54 of performing the additional lookup, before performing the cache access or a linefill operation in step 56. On the other hand, if the additional lookup is predicted not to be needed ("N"), the cache access/linefill is performed 56 without performing the additional lookup.

Figure 9:
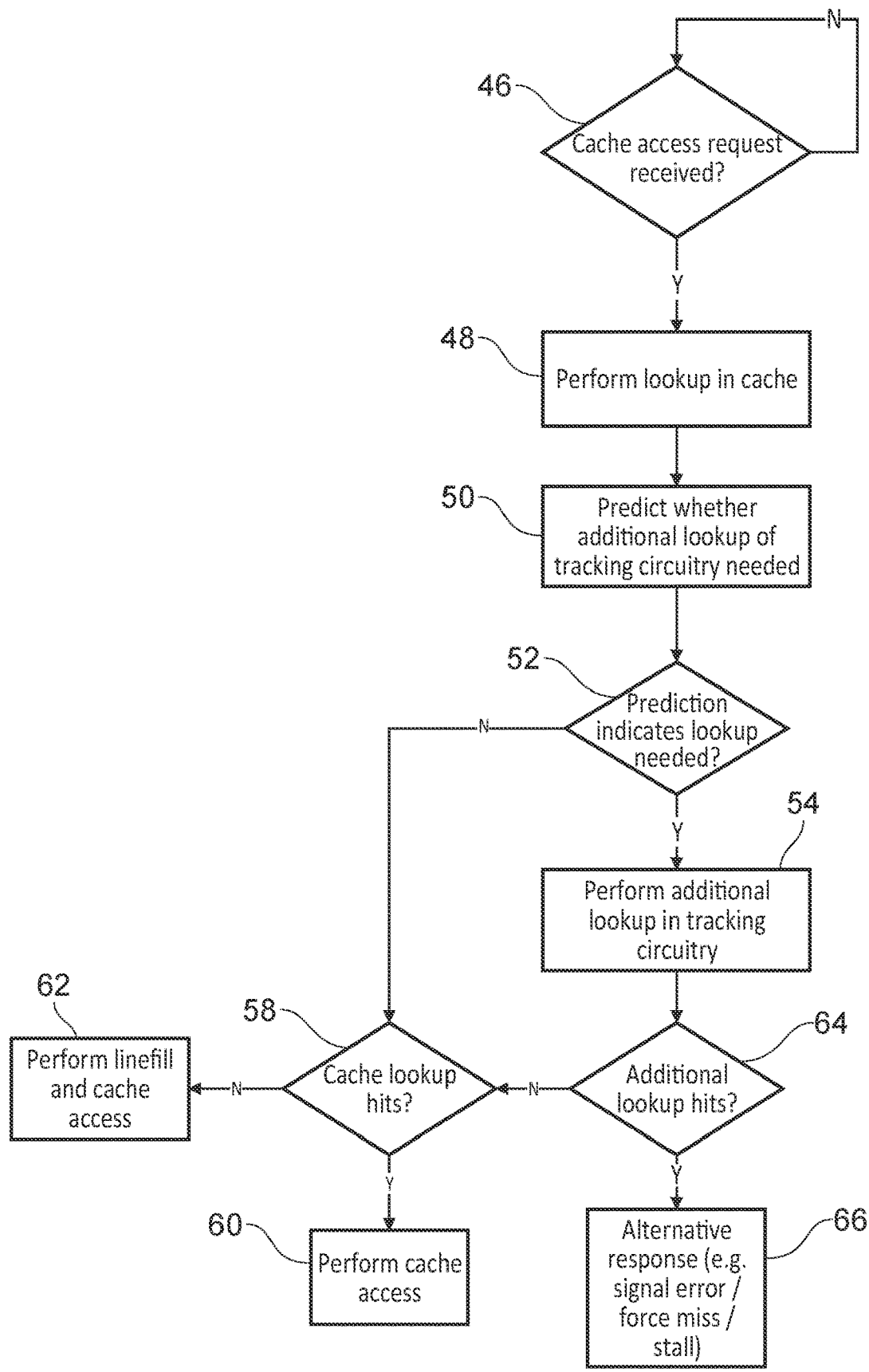
FIG. 9 is a flow diagram illustrating a particular example of the method of FIG. 8.

FIG. 9 shows a more detailed example of the method shown in FIG. 8. In the method of FIG. 9, when it is determined 52 that the additional lookup is predicted not to be needed ("N"), the method includes a step 58 of determining whether the cache lookup resulted in a hit or miss. In response to a cache hit ("Y"), a cache access is performed 60, whereas in response to a cache miss ("N"), the method includes a step 62 of performing a linefill operation before performing a cache access.

The method in Figured 9 also includes a step 64 of determining whether the additional lookup, if performed, resulted a hit. If the additional lookup did result in a hit ("Y"), an alternative response (e.g. signalling an error, forcing a miss and/or stalling) is enacted.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Further, the words "comprising at least one of . . ." in the present application are used to mean that any one of the following options or any combination of the following options is included. For example, "at least one of: A; B and C" is intended to mean A or B or C or any combination of A, B and C (e.g. A and B or A and C or B and C).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

Examples of the present technique include:

(1) An apparatus comprising:
a cache comprising a plurality of cache entries;
cache access circuitry responsive to a cache access request to perform, based on a target memory address associated with the cache access request, a cache lookup operation;
tracking circuitry to track pending requests to modify cache entries of the cache; and
prediction circuitry responsive to the cache access request to make a prediction of whether the pending requests tracked by the tracking circuitry include a pending request to modify a cache entry associated with the target memory address,
wherein the cache access circuitry is responsive to the cache access request to determine, based on the prediction, whether to perform an additional lookup of the tracking circuitry.

(2) The apparatus of clause 1, wherein
the tracking circuitry comprises at least one of:
a store buffer to track pending store operations to store data in the cache; and
cache refill control circuitry, the cache refill control circuitry being responsive to detecting a cache miss to copy requested data from memory into the cache, wherein the cache refill control circuitry is configured to track pending evictions of data from the cache and pending allocations of data to the cache.

(3) The apparatus of clause 2, wherein:
the tracking circuitry comprises the store buffer;
the prediction circuitry comprises prediction data storage circuitry to store prediction data for use in making the prediction; and
the prediction circuitry is responsive to a store request being issued to the store buffer, the store request being associated with a given memory address, to update the prediction data to indicate that a store buffer lookup should be performed, as the additional lookup, in response to a subsequent cache access request associated with the given memory address.

(4) The apparatus of clause 2 or clause 3, wherein:
the tracking circuitry comprises the store buffer;
the prediction circuitry comprises prediction data storage circuitry to store prediction data for use in making the prediction; and
the prediction circuitry is responsive to misses being detected following lookups, based on a given memory address, in both the cache and the store buffer to update the prediction data to indicate that the additional lookup need not be performed in response to a subsequent access request associated with the given memory address.

(5) The apparatus of any of clauses 2 to 4, wherein:
each cache entry is configured to store a block of data, and the cache access request specifies a subset of the block of data stored in the cache entry associated with the target address;
the tracking circuitry comprises the store buffer;
the prediction circuitry is configured to make a further prediction, in response to predicting that the pending store operations tracked by the store buffer include a pending request to store the target data to the cache entry associated with the target memory address, of whether the target data encompasses the subset specified by the cache access request;
the cache access circuitry is configured to determine, based on the prediction and the further prediction, whether to perform an additional lookup of the tracking circuitry.

(6) The apparatus of any of clauses 2 to 5, wherein:
the tracking circuitry comprises the cache refill control circuitry;
the prediction circuitry comprises prediction data storage circuitry to store prediction data for use in making the prediction; and
the prediction circuitry is responsive to a cache miss being detected following a lookup, based on a given memory address, in the cache to update the prediction data to indicate that a cache refill control circuitry lookup should be performed, as the additional lookup, in response to a subsequent cache access request associated with the given memory address as the target memory address.

(7) The apparatus of any of clauses 2 to 6, wherein:
the tracking circuitry comprises the cache refill control circuitry;
the prediction circuitry comprises prediction data storage circuitry to store prediction data for use in making the prediction; and
the prediction circuitry is responsive to a cache hit being detected following the lookup, based on a given memory address, in the cache to update the prediction data to indicate that a cache refill control circuitry lookup need not be performed, as the additional lookup, in response to a subsequent cache access request associated with the given memory address as the target memory address.

(8) The apparatus of any preceding clause, wherein:
the cache comprises a set-associative cache; and
the apparatus comprises cache way prediction circuitry responsive to the cache access request to predict which of a plurality of ways stores data associated with the target memory address, the cache way prediction circuitry comprising the prediction circuitry.

(9) The apparatus of clause 8, wherein:
the cache way prediction circuitry comprises prediction data storage circuitry to store, for corresponding address information, prediction data indicative of:
a predicted one of the plurality of ways that is predicted to store data associated with the corresponding address information; and
whether the pending requests tracked by the tracking circuitry are predicted to include a pending request to modify a cache entry associated with the corresponding address information.

(10) The apparatus of any preceding clause, wherein the pending requests to modify cache entries to the cache comprise at least one of:
pending store operations to store data in the cache;
pending invalidation operations to invalidate data in the cache;
pending linefill operations to copy data from memory into the cache; and
pending eviction operation to evict data from the cache.

(11) A method comprising:
tracking, using tracking circuitry, pending requests to modify cache entries of a cache, the cache comprising a plurality of cache entries; and
in response to a cache access request:
performing, based on a target memory address associated with the cache access request, a cache lookup operation;
making a prediction of whether the pending requests tracked by the tracking circuitry include a pending request to modify a cache entry associated with the target memory address; and
determining, based on the prediction, whether to perform an additional lookup of the tracking circuitry.

(12) A computer program comprising instructions which, when executed on a computer, cause the computer to fabricate an apparatus comprising:
a cache comprising a plurality of cache entries;
cache access circuitry responsive to a cache access request to perform, based on a target memory address associated with the cache access request, a cache lookup operation;
tracking circuitry to track pending requests to modify cache entries of the cache; and
prediction circuitry responsive to the cache access request to make a prediction of whether the pending requests tracked by the tracking circuitry include a pending request to modify a cache entry associated with the target memory address,
wherein the cache access circuitry is responsive to the cache access request to determine, based on the prediction, whether to perform an additional lookup of the tracking circuitry.

(13) A computer-readable medium to store the computer program of clause 12.

We claim:
1. A method comprising:
tracking, using tracking circuitry, pending requests to modify cache entries of a cache, the cache comprising a plurality of cache entries, and the tracking circuitry comprising a store buffer to track pending store operations to store data in the cache; and
in response to a cache access request:
performing, based on a target memory address associated with the cache access request, a cache lookup operation;
making a prediction of whether the pending requests tracked by the tracking circuitry include a pending request to modify a cache entry associated with the target memory address; and
determining, based on the prediction, whether to perform an additional lookup of the tracking circuitry; and
in response to misses being detected following lookups, based on a given memory address, in both the cache and the store buffer, updating prediction data to indicate that a store buffer lookup need not be performed, as the additional lookup, in response to a subsequent access request associated with the given memory address,
wherein the prediction data is for use in making the prediction.

2. An apparatus comprising:
a cache comprising a plurality of cache entries;
cache access circuitry responsive to a cache access request to perform, based on a target memory address associated with the cache access request, a cache lookup operation;
tracking circuitry to track pending requests to modify cache entries of the cache; and
prediction circuitry responsive to the cache access request to make a prediction of whether the pending requests tracked by the tracking circuitry include a pending request to modify a cache entry associated with the target memory address,
wherein:
the cache access circuitry is responsive to the cache access request to determine, based on the prediction, whether to perform an additional lookup of the tracking circuitry;
the tracking circuitry comprises a store buffer to track pending store operations to store data in the cache;
the prediction circuitry comprises prediction data storage circuitry to store prediction data for use in making the prediction; and
the prediction circuitry is responsive to misses being detected following lookups, based on a given memory address, in both the cache and the store buffer to update the prediction data to indicate that a store buffer lookup need not be performed, as the additional lookup, in response to a subsequent access request associated with the given memory address.

3. The apparatus of claim 2, wherein
the tracking circuitry further comprises
cache refill control circuitry, the cache refill control circuitry being responsive to detecting a cache miss to copy requested data from memory into the cache, wherein the cache refill control circuitry is configured to track pending evictions of data from the cache and pending allocations of data to the cache.

4. The apparatus of claim 2, wherein:
the prediction circuitry comprises prediction data storage circuitry to store prediction data for use in making the prediction; and
the prediction circuitry is responsive to a store request being issued to the store buffer, the store request being associated with a given memory address, to update the prediction data to indicate that a store buffer lookup should be performed, as the additional lookup, in response to a subsequent cache access request associated with the given memory address.

5. The apparatus of claim 2, wherein:
each cache entry is configured to store a block of data, and the cache access request specifies a subset of the block of data stored in the cache entry associated with the target address;
the prediction circuitry is configured to make a further prediction, in response to predicting that the pending store operations tracked by the store buffer include a pending request to store the target data to the cache entry associated with the target memory address, of whether the target data encompasses the subset specified by the cache access request;
the cache access circuitry is configured to determine, based on the prediction and the further prediction, whether to perform an additional lookup of the tracking circuitry.

6. The apparatus of claim 3, wherein:
the prediction circuitry comprises prediction data storage circuitry to store prediction data for use in making the prediction; and
the prediction circuitry is responsive to a cache miss being detected following a lookup, based on a given memory address, in the cache to update the prediction data to indicate that a cache refill control circuitry lookup should be performed, as the additional lookup, in response to a subsequent cache access request associated with the given memory address as the target memory address.

7. The apparatus of claim 3, wherein:
the prediction circuitry comprises prediction data storage circuitry to store prediction data for use in making the prediction; and
the prediction circuitry is responsive to a cache hit being detected following the lookup, based on a given memory address, in the cache to update the prediction data to indicate that a cache refill control circuitry lookup need not be performed, as the additional lookup, in response to a subsequent cache access request associated with the given memory address as the target memory address.

8. The apparatus of claim 2, wherein:
the cache comprises a set-associative cache; and
the apparatus comprises cache way prediction circuitry responsive to the cache access request to predict which of a plurality of ways stores data associated with the target memory address, the cache way prediction circuitry comprising the prediction circuitry.

9. The apparatus of claim 8, wherein:
the cache way prediction circuitry comprises prediction data storage circuitry to store, for corresponding address information, prediction data indicative of:
a predicted one of the plurality of ways that is predicted to store data associated with the corresponding address information; and
whether the pending requests tracked by the tracking circuitry are predicted to include a pending request to modify a cache entry associated with the corresponding address information.

10. The apparatus of claim 2, wherein
the pending requests to modify cache entries to the cache comprise at least one of:
pending store operations to store data in the cache;
pending invalidation operations to invalidate data in the cache;
pending linefill operations to copy data from memory into the cache; and
pending eviction operation to evict data from the cache.

11. A non-transitory computer-readable storage medium to store a computer program which, when executed on a computer, causes the computer to fabricate an apparatus comprising:
a cache comprising a plurality of cache entries;
cache access circuitry responsive to a cache access request to perform, based on a target memory address associated with the cache access request, a cache lookup operation;
tracking circuitry to track pending requests to modify cache entries of the cache; and
prediction circuitry responsive to the cache access request to make a prediction of whether the pending requests tracked by the tracking circuitry include a pending request to modify a cache entry associated with the target memory address,
wherein:
the cache access circuitry is responsive to the cache access request to determine, based on the prediction, whether to perform an additional lookup of the tracking circuitry;
the tracking circuitry comprises a store buffer to track pending store operations to store data in the cache;
the prediction circuitry comprises prediction data storage circuitry to store prediction data for use in making the prediction; and
the prediction circuitry is responsive to misses being detected following lookups, based on a given memory address, in both the cache and the store buffer to update the prediction data to indicate that a store buffer lookup need not be performed, as the additional lookup, in response to a subsequent access request associated with the given memory address.

* * * * *